United States Patent
Fontana et al.

(10) Patent No.: US 6,333,062 B1
(45) Date of Patent: *Dec. 25, 2001

(54) METHOD FOR INCREASING CARCASS YIELDS IN POULTRY

(75) Inventors: Eddy A. Fontana, West Des Moines; Arlene T. Lamptey, Des Moines; Friedhelm Brinkhaus, Urbandale, all of IA (US); G. L. Lewis, Jr., Bentonville, AK (US)

(73) Assignee: Kemin Industries, Inc., Des Moines, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/627,287

(22) Filed: Jul. 28, 2000

Related U.S. Application Data

(63) Continuation-in-part of application No. 09/271,757, filed on Mar. 17, 1999, now Pat. No. 6,174,558.

(51) Int. Cl.[7] .................................................. A23K 1/00
(52) U.S. Cl. ..................... 426/635; 426/630; 426/807; 426/53; 426/54
(58) Field of Search .................................. 426/635, 630, 426/807, 53, 54

(56) References Cited

U.S. PATENT DOCUMENTS

| | | | |
|---|---|---|---|
| 3,657,421 | 4/1972 | Berger | 424/122 |
| 5,356,810 | 10/1994 | Fleno et al. | 435/225.1 |
| 5,459,162 | 10/1995 | Saxton | 514/499 |
| 6,174,558 * | 1/2001 | Lamptey | 426/635 |

FOREIGN PATENT DOCUMENTS

| | | |
|---|---|---|
| WO 95/22601 | 8/1995 | (WO) . |
| WO 98/20750 | 11/1997 | (WO) . |

OTHER PUBLICATIONS

Steve Leeson & Linda J. Caston, Adding Roxazyme to Wheat Diets of Chicken and Turkey Broilers, 5 J. Appl. Poultry Res.167 (1996).

Merton H. Pubols, The Effects of alpha–Galactosidase on Energy Values of Soybean Meal Rations, 72 J. Poultry Sci. 126 (Suppl. 1) (1993).

Craig N. Coon et al., The Effect of Oligosaccharides on the Nutritive Value of Soybean Meal (1989) (unpublished manuscript provided by the Nat'l Soybean Processors Ass'n).

Craig N. Coon et al., Effect of Oligosaccharide–Free Soybean Meal on True Metabolizable Energy and Fiber Digestion in Adult Roosters, 69 J. Poultry Sci. 787 (1990).

I.H. Knap et al., Improved Bioavailability of Energy and Growth Performance from Adding Alpha–Galactosidase (from Aspergillus sp.) to Soybean Meal–Based Diets, Proc. Aust. Poult. Sci. Sym. (1996).

G.G. Irish et al., Removal of the alpha–Galactosides of Surcrose from Soybean Meal using either Ethanol Extraction or Exogenous alpha–Galactosidase and Broiler Performance, 74 J. Poultry Sci. 1484 (1995).

* cited by examiner

Primary Examiner—Chhaya D. Sayala
(74) Attorney, Agent, or Firm—Kent A. Herink; Daniel A. Rosenberg

(57) ABSTRACT

A poultry feed composition including protein, vitamins and minerals, and a source of carbohydrates from the group consisting of soybean meals and corn supplemented with an α-galactosidase-based enzyme blend that catalyzes the degradation of the galactoside. The addition of the α-galactosidase-based enzyme blend increases the ratio of gain to feed, increases the amount of white meat, increases the mass and yield of the carcass, or decreases the amount of fat deposited during growth of a chicken fed the feed composition, relative to the chicken fed on an identical feed composition absent the α-galactosidase-based enzyme blend.

16 Claims, 2 Drawing Sheets

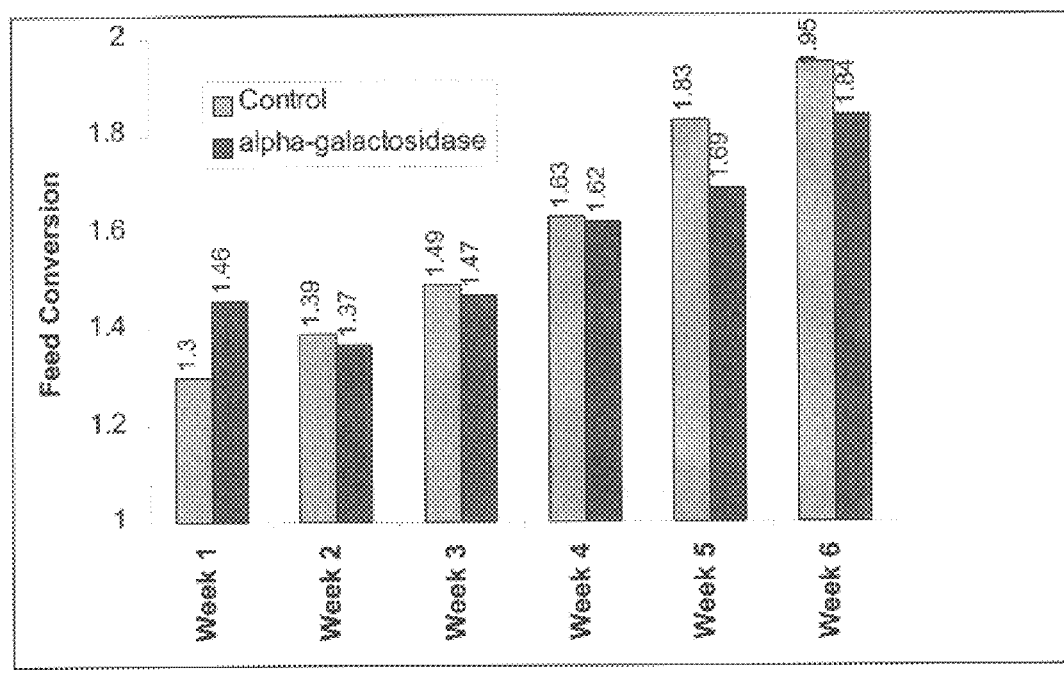
FIGURE 1: FEED CONVERSION OVER TIME

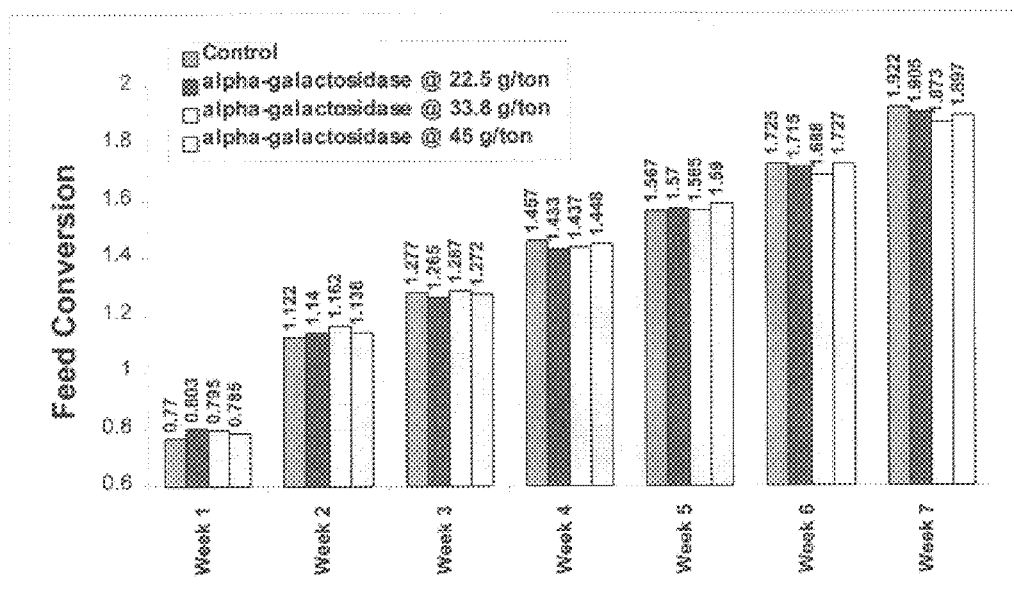
FIGURE 2: FEED CONVERSIONS OVER TIME

METHOD FOR INCREASING CARCASS YIELDS IN POULTRY

RELATED APPLICATION

This is a Continuation-in-Part of Ser. No. 09/271,757 filed Mar. 17, 1999 now U.S. Pat. No. 6,174,558.

BACKGROUND OF THE INVENTION

1. Field of the Invention

The invention relates generally to a method for increasing the carcass yield of poultry and, more specifically, to the use of the enzyme α-galactosidase in combination with other enzymes as a feed supplement to increase the yield of the carcass and decrease fat deposition in broiler chickens fed a commercial corn/soybean meal diet.

2. Background of the Prior Art

Many grains such as wheat and barley that are typically used as feed ingredients for broiler feed contain up to 10% of a fiber fraction consisting of non-starch carbohydrates. Chickens, like other animals, are not able to digest these non-starch carbohydrates since they lack the digestive enzymes in their digestive systems. Use of exogenously supplied enzymes in wheat and barley based diets is common practice and is recognized to increase feed conversion, and frequently also body weight, as it allows the animal to utilize the otherwise non-digestible fiber portion of the diet. Enzymes used to improve the digestibility of wheat and barley are cellulases, pectinases, α-amylases and arabinoxylanases for wheat and β-glucanases for barley.

The soybean meal component of a corn/soybean meal diet, and to a lesser extent the corn fraction of such a diet, contains typically non-starch polysaccharides such as galactosides which also cannot be digested by the chicken. Chickens lack the enzyme α-galactosidase, which would allow the animal to break down these non-starch polysaccharides into sugar molecules which then can be used by the animal. However, the chicken small intestinal tract houses a microbial flora that is reported to take up and utilize the galactoside fraction of soybean meal, competing not only for the energy content with the animal, but also causing secondary problems such as flatus and diarrhea.

Efforts have been made by others to produce an enzyme which will liberate nutrients from the non-digestible components of corn/soybean base diets. Results from these efficacy trials have been inconsistent. Accordingly, research on the use of enzymes such as cellulases, glucanases, xylanases, mannanases and also α-galactosidase has led to the conclusion that these enzymes improve feed conversion as well as increase body weights, but have minimal effect on increasing white meat, increasing carcass weight, or decreasing fat deposition.

SUMMARY OF THE INVENTION

The invention consists of a method for increasing feed conversion, increasing the yield of white meat, increasing the yield of the carcass, including edible elements such as the breast, thigh, wings, legs, and back, and decreasing the deposition of fat in poultry through the addition of a blend of enzymes, primarily including α-galactosidase, to a commercial corn/soybean meal diet. The supplement is fed at a rate of between about 22.5 g/ton α-galactosidase and about 75 g/ton α-galactosidase of a commercial corn/soybean meal diet, and preferably between about 30 g/ton and about 45 g/ton. Feed conversion is increased between about 1% and about 10%, breast yields are increased by between about 1% and about 10%, carcass yields are increased by between about 1% and about 20%, and decrease in fat deposition is between about 1% and about 20%.

An object of the present invention is to provide a method for increasing the yield of carcass mass in poultry.

Another object of the present invention is to provide a method for decreasing the deposition of fat in poultry.

A further object of the invention is to provide a feed supplement comprising a blend of enzymes including α-galactosidase which when added to a commercial corn/soybean meal diet improves the feed conversion, reduces the deposition of fat, and increases the yield of carcass mass in poultry.

These and other objects of the invention will be made apparent to persons skilled in the art upon a review of this specification, the associated figures, and the appended claims.

BRIEF DESCRIPTION OF THE DRAWINGS

FIG. 1 is a graphical representation of feed conversion data from a feeding trial using a control diet and diets supplemented with α-galactosidase-based enzyme blend at three different concentrations.

FIG. 2 is a graphical representation of feed conversion data from a second feeding trial using a control diet and diets supplemented with α-galactosidase-based enzyme blend at three different concentrations.

DETAILED DESCRIPTION OF A PREFERRED EMBODIMENT

The terms "enzyme mixture", "-based enzyme mixture", "enzyme blend", "-based enzyme blend" or "blend of enzymes" as used herein are intended to refer to a combination of enzymes as described in the following table.

| Ingredient | Activity | units/g raw material |
| --- | --- | --- |
| Asp. niger | -galactosidase | 600–1100 |
| Asp. niger | -glucanase | 40–150 |
|  | xylanase | 50–150 |
|  | cellulase | 300–500 |
| B. subtilis | -amylase | 4000–6000 |
|  | protease | not determined |
|  | -glucanase | not determined |
| Tr. longibrachiatum | cellulase | 900–1300 |
|  | xylanase | 600–1200 |
| B. licheniformis | protease | 1500–3000 |

Given the well-known variation in activities of these enzymes from various sources (and even from the same source), as well as the side-chain activities present in sometimes undetermined amounts, a skilled practitioner will readily recognize that adjustments in the sources and quantities of the enzymes may be necessary in order to maintain the efficacy of the enzyme blend when different sources of the main enzymes are used and sometimes perhaps even batch to batch. In the preferred embodiment, the ingredients are included in the blend of enzymes in ratios so that the application of the blend of ingredients results in 33.6 g/ton of the -galactosidase source from Asp. niger, 13.4 g/ton of the -glucanase, xylanase and cellulase source from Asp. niger, 11.2 g/ton of the -amylase, protease and -glucanase source from B. subtilis, 3.4 g/ton of the cellulase and xylanase source from Tr. longibrachiatuin, and 11.2 g/ton of the protease source from B. licheniformis. The inclusion rates of these enzyme sources in the enzyme blend may be varied substantially without reducing the efficacy of the enzyme blend. The inclusion rates of the ingredients on a g/ton basis should be adjusted to account for variations in the activity units per gram of raw material outside the range given in the last column of the above table.

Several studies were conducted to determine the effects of a blend of enzymes including primarily α-galactosidase, for broilers on body weight, feed conversion, daily gain, mortality, to and carcass measurements of broilers fed corn/soybean based diets. In a preferred embodiment, diets were formulated to be consistent with commercial practices, and consisted of a starter, finisher, withdrawal 1, withdrawal 2, and withdrawal 3 rations, fed to broilers during a 52 day growout period. The starter diet was fed to broilers from birth to 13 days old. The finisher diet was fed to broilers from 14 to 30 days old. The withdrawal 1 diet was fed to broilers from 31 to 38 days old; withdrawal 2 from 39 to 49 days old; and withdrawal 3 from 49 days to market. The protocols used a control diet without supplementation and the control diet supplemented with an enzyme supplement that consists of 30% α-galactosidase by weight. The enzyme supplement is added to increase the amount of α-galactosidase in the diet by between a minimum of 22.5 g/ton and a maximum of 75 g/ton, with a preferred range of between about 30 g/ton and about 45 g/ton.

An alternative measurement of the rate of inclusion of α-galactosidase is by determining the units ($\mu$moles p-nitrophenol/minute/ml) of α-galactosidase activity using, a suitable assay. the data in this specification were collected using an assay based on the hydrolysis by α-galactosidases of the terminal, non-reducing α-galactose residues in α-galactosides including galactose oligosaccharides. A substrate of 1.2 mM p-nitrophenol α-galactopyranoside is created by dilution with 0.05 M sodium acetate buffer and incubated for 5 minutes at 37° C. A dilute solution of the product is mixed with the 0.05 M sodium acetate buffer and the mixture is added to the substrate and incubated for 15 minutes at 37° C. A stop reagent of 0.0625 M borax-NaOH buffer is added. Release of p-nitrophenol from the hydrolysis of p-nitrophenol α-galacto-pyranoside is measured at 405 nm in a spectrophotometer. Using this method, supplementation is done to increase the amount of α-galactosidase in the diet by between a minimum of 15,700 units/ton and a maximum of 52,500 units/ton, with a preferred range of between about 21,000 units/ton and about 31,500 units/ton. Data support improvement in feed conversion of between 1% and 10%, increases in breast meat of between 1% and 10%, and decreases in fat deposition (as measured by the fat pad) of between 1% and 20%.

Further quantitative methodologies were utilized for analyzing components of the enzyme blend. The assays which follow are respective to each enzyme as identified.

β-glucanase ($\mu$mol glucose/min/g)

Unit equals the amount of enzyme that liberates 1 $\mu$mol of glucose equivalent per minute under the specified conditions.

0.5% barley β-glucan substrate in phosphate buffer, pH=7.5.

1 ml appropriately-diluted enzyme sample plus 1 ml β-glucan substrate, incubated at 37 degrees C for 30 minutes.

Glucose lilberated is measured by Nelson-Somogyi method with the addition of 1 ml Nelson reagent C, 1 ml colour reagent and 5 ml water.

Read absorbance at 540 nm against a glucose standard curve.

Xylanase ($\mu$mol xylose/min/g)

Unit equals the amount of enzyme that liberates one $\mu$mol of xylose equivalents per minute under the specified conditions.

0.5% birchwood xylan substrate in 0.05M citrate buffer, pH=5.3.

1 ml appropriately-diluted enzyme sample plus 1 ml xylan substrate, incubated at 50 degrees C for 15 minutes.

Xylose liberated is measured by Nelson-Somogyi method with the addition of 1 ml Nelson reagent C, 1 ml colour reagent and 5ml water.

Read absorbance at 540 nm against a xylose standard curve.

Celluluse ($\mu$mol glucose/min/g)

Unit equals the amount of enzyme that liberates one $\mu$mol of glucose equivalents per minute under the specified conditions.

0.4% carboxymethyl cellulose in 0.1 M acetate buffer, pH=4.8.

1 ml appropriately-diluted enzyme sample plus 1 ml CMC substrate, incubated at 50 degrees C for 20 minutes.

Glucose liberated is measured by Nelson-Somogyi method with the addition of 1 ml Nelson reagent C, 1 ml colour reagent and 5 ml water.

Read absorbance at 540 nm against a xylose standard curve.

Protease ($\mu$g azocasein solubilized/min/g)

Unit equals the amount of enzyme that solubilizes 1 $\mu$g azocasein per minute under the specified conditions.

0.5% azocasein (Serva) in 0.1M phosphate buffer, pH=7.5.

1 ml of appropriately-diluted enzyme sample plus 1 ml azocasein substrate, incubated at 37 degrees C for 15 minutes.

Add 4 ml 10% TCA and heat at 50 degrees C for 15 minutes.

Centrifuge, remove a 3 ml aliquot and add 1 ml 2N NaOH.

Read absorbance at 440 nm against an azocasein standard curve.

α-amylase ($\mu$mol glucogidic linkage hydrolyzed/min/g)

Unit equals the amount of enzyme catalyzing the hydrolysis of 1 $\mu$mol glucosidic linkage per minute under the specified conditions.

Phadeba's tablet test kit (Pharmacia Diagnostics)

1 ml appropriately-diluted enzyme sample plus 5 ml phosphate buffer, pH=7.5, incubated 15 minutes at 37 degrees C after the addition of the Phadebas tablet.

Add 1 ml 1N NaOH, centrifuge and read absorbance at 620 nm.

Calculate activity compared to the standard curve supplied with the substrate tablets.

Results from these studies indicate an α-galactosidase-based enzyme mixture for broilers improves performance of broilers, and modifies carcass composition via a process speculated to improve the efficiency of nutrient partitioning. Breast meat in the U.S. commands a premium price. Any increase in the yield of breast meat provides integrators with an immediate windfall on the most valuable portion of a chicken. On the same token, improved yields of the remaining edible portions of a chicken, such as the thigh, wings, legs, and back, are also beneficial to poultry growers to maximize the value of each bird.

It is also possible that α-galactosidase could form part of a comprehensive nutritional program to produce "leaner"

broilers. From a nutritional point of view, the protein/amino acid liberation induced by α-galactosidase would have a sparing effect on supplemented levels of proteins and crystalline amino acids. Such a sparing effect would permit nutritionists to decrease the cost of poultry diets.

EXAMPLE 1

Two thousand four hundred straight run Ross x Hubbard HY commercial broiler chicks were randomly distributed among 24 identical pens. A total of 100 chicks (50 males and 50 females) were placed in each pen to provide a 0.75 density. Twelve pens were randomly allocated to either control starter, grower, and finisher basal diets without the enzyme supplement, or basal diets supplemented with an enzyme supplement including 30% α-galactosidase by weight. The basal diets used contain a nutrient profile which is representative of those used commercially. The nutrient and ingredient composition of the diets are outlined in Table 1.

TABLE 1

Composition and Calculated Nutrients of Diets

|  | Starter (%) | Grower (%) | Finisher (%) |
|---|---|---|---|
| Ingredients |  |  |  |
| Corn | 62.89 | 64.35 | 70.53 |
| Soybean Meal | 23.02 | 18.88 | 13.00 |
| Fish Meal (Menh.) | 5.00 | 5.00 | — |
| M & B Meal | 4.05 | 3.00 | 5.00 |
| Poultry Fat | 2.15 | 1.79 | 1.77 |
| Bakery Meal | 1.25 | 5.00 | 5.00 |
| Limestone | 0.26 | 0.36 | 0.38 |
| MHA[1] | 0.19 | 0.23 | 0.16 |
| Salt | 0.26 | 0.23 | 0.20 |
| Vit. & Min. Premix | 0.075 | 0.075 | 0.0625 |
| Analysis |  |  |  |
| Met. Energy, kcal/kg | 3124 | 3157 | 3179 |
| Crude protein (%) | 22.00 | 19.00 | 17.00 |
| Calcium (%) | 0.85 | 0.84 | 0.75 |
| Avail. Phos. (%) | 0.43 | 0.43 | 0.38 |
| Lysine (%) | 1.265 | 1.02 | 0.79 |
| TSAA[a] (%) | 0.84 | 0.815 | 0.685 |

[1]Methionine hydroxy anaolog
[a]Total sulfur amino acid

All of the rations were manufactured in a commercial feed mill, and were produced in the form of crumbles. The enzyme supplement was added by spraying on a mixture of 112 g of enzyme supplement and 888 g of water per ton of feed, resulting in a ration having 34g of α-galactosidase per ton or an α-galactosidase activity level of 23,500 units per ton. Three hundred pound batches of feed were weighed into a horizontal mixer, mixed with 150 g mixture of the enzyme supplement for approximately 2.5 minutes, and split evenly among the various treatment pens. Samples were taken for subsequent enzyme activity determinations.

The feeding program consisted of the starter, grower, and finisher diets being fed from 0–20, 21–35, and 36–45 days of age, respectively. Feed was provided ad libitum. Commercial type watering, feeding, lighting, and husbandry programs were employed throughout the study. At 45 days of age, birds were group weighed by pen, counted, and feed was weighed to determine average body weights, feed conversion, and mortality. Twenty-four males and 24 females broilers from the control and α-galactosidase treatment were weighed individually, and sacrificed for subsequent carcass measurements.

As reported in Table 2, body weights at 45 days of age for birds in the control and α-galactosidase treatments were 2.25 and 2.36 kg, respectively. The increased body weight observed in Table 2 indicates that the possible nutrient liberation from α-galactosidase may have elevated the plane of nutrition to a level which allowed the birds to begin to reach their genetic potential. The implications from these findings are that, depending on the production objectives, broilers can be fed a significantly lower plane of nutrition, which will reduce feed cost, and still attain competitive growth rates. Conversely, production of broiler meat can be expedited by the higher plane of nutrition provided by α-galactosidase supplementation, while improving feed utilization.

Feed conversions were adjusted for mortality, and standardized to a 2.27 kg weight. Results, as reported in Table 2, are a feed conversion rate of 1.94 for the control ration and 1.86 for the supplemented ration. When feed conversion is adjusted for mortality, the results for the control and α-galactosidase treated birds were 1.93 and 1.89, respectively. The improvements in feed conversion induced by α-galactosidase supplementation demonstrate that α-galactosidase enhances feed utilization most likely by liberating macro and micro nutrients which would otherwise be unavailable (indigestible) to broilers. The net effect appears to be an instantaneous increased plane of nutrition and assimilation of nutrients. It can be postulated that the increased availability of nutrients induced by α-galactosidase supplementation (see Table 3) could decrease the metabolic requirements during the digestive process. This would result in a better utilization of nutrients for other metabolic functions such as growth.

TABLE 2

The Effects of α-galactosidase on Broiler Performance at 45 days

|  | Control | α-galactosidase |
|---|---|---|
| Body Wt. (kg) | 2.25[a] | 2.36[b] |
| Feed Conv. | 1.93[a] | 1.89[a] |
| Feed Conv. Adj. Wt. | 1.94[a] | 1.86[b] |
| Livability (%) | 94.02[a] | 92.37[a] |

[a-b]means within a row with no common superscript differ significantly (P < .05)

TABLE 3

The increased availability of nutrients induced by α-galactosidase

|  | Reducing Sugars (mM glucose) | Soluble Proteins (µg/ml) |
|---|---|---|
| Control | 4.6 | 1726 |
| α-galactosidase | 23.1 | 2791 |

To conduct an assay of the reducing sugars, four reagents are needed. A reagent of 0.1M sodium acetate buffer (pH 5.0) is made by first dissolving 8.16 g sodium acetate in 950 mL deionized water. The pH is adjusted to 5.0 with glacial acetic acid. A 3,5 dinitrosalicylic acid (DNSA) reagent is made by dissolving 1 g sodium hydroxide in 97.75 g deionized water. To this solution, 1 g 3,5 dinitrosalicylic acid is added and stirred to dissolve the DNSA. Then, 0.05 g sodium sulfite and 200 µL phenol are added and the solution is mixed well. A 40% Rochelle salt reagent is made by adding 40 g potassium sodium tartrate (Rochelle salt) to 60 g deionized water and stirred to dissolve the Rochelle salt.

Finally, a 10 mM glucose solution is made by adding 0.045 g glucose to 25 mL of the sodium acetate buffer.

An appropriate amount of sodium acetate buffer is pipetted into each test tube to achieve the correct dilution factor for the individual sample in a total volume of 1 mL (i.e., for a 100×dilution, use 990 μL buffer and 10 μL sample). Pipet the appropriate amount of sample into each tube. Mix well.

A standard curve as shown in the following table is prepared:

| Std. Concentration (mM glucose) | Vol. of 10 mM glucose (μL) | Vol. of Sodium Acetate Buffer (μL) |
|---|---|---|
| 0 | 0 | 1000 |
| 0.5 | 50 | 950 |
| 1.0 | 100 | 900 |
| 1.5 | 150 | 850 |
| 2.0 | 200 | 800 |

To develop the color, add 1 mL DNSA solution to each tube of samples and standards. Place tubes in a boiling water bath for 15 minutes to allow color to develop. Remove tubes from boiling water bath and immediately add 400 μL Rochelle salt. Mix well. Allow tubes to cool before reading on the spectrophotometer. For the spectrophotometric measurement, read each tube at 575 nm, beginning with standards to establish a line of regression. Use the above standard curve to calculate the concentration of reducing sugars in each sample tube using the following formula: dilution factor x concentration from std. curve= concentration in sample (mM glucose).

Broilers in the control treatment had heavier abdominal fat pad weights, as a percent of the live weight, than birds in the α-galactosidase group (Table 4). The magnitude of this increase was 8.8% (1.82% vs. 1.66%). Conversely, a significant increase in breast and thigh meat yield of 5.0% and 2.8%, respectively, was observed in the α-galactosidase treated broilers when compared to the controls. It is a well established fact that protein or amino acid supplementation above baseline levels will induce a shift from lipogenic activity to protein accretion in broilers. The results of such nutrient partitioning are leaner birds with a proportionate increase in meat yield. The improvement in meat yield, and the concurrent decrease in fat deposition observed in this study would support the theory that the α-galactosidase mixture's exogenous enzymatic activity on a corn/soybean based diet liberates proteins and amino acids, which are then utilized by broilers to increase meat yield.

TABLE 4

The Effects of α-galactosidase on Carcass Measurements

|  | Control | α-galactosidase |
|---|---|---|
| Live wt. (kg) | 2.35$^a$ | 2.45$^a$ |
| WOG (%) | 66.50$^a$ | 66.90$^a$ |
| Fat Pad (%) | 1.82$^a$ | 1.66$^a$ |
| Pectoralis Major & Minor (%) | 12.08$^a$ | 12.72$^b$ |
| Thigh (%) | 12.63$^a$ | 13.00$^b$ |

$^{a-b}$means within a row with no common superscript differ significantly (P < .05).

EXAMPLE 2

Trial 1: The performance of broilers fed an enzyme-supplemented diet was compared to those fed a basal diet over the six-week duration of the trial. Performance was monitored by the measurement of feed conversion, body weight and percent mortality. Four hundred male broiler chicks were randomly assigned to 20 floor pens with 20 birds per pen, thus providing 10 repetitions per treatment. The experimental enzyme product was used at an application rate of 150 g/ton of finished feed. As in Example 1, 112 g of the enzyme concentrate was diluted with potable water to create one liter of a solution that was then sprayed onto the mash feed as it mixed.

A three-feed program was used in which the starter diet was fed for 21 days, the grower from day 21 to 35, and the finisher/withdrawal from day 35 to the conclusion of the trial at 42 days. A coccidiostat (Coban®-60 brand monensin sulfate from Lily) was incorporated into the starter and grower diets at the rate of 0.075%. Feed and water were available ad libitum over the duration of the study. Nutrient specifications and composition of the diets are outlined in Table 5 below.

TABLE 5

COMPOSITION AND NUTRIENT SPECIFICATIONS OF DIETS

| Ingredient/Nutrient | Starter (%) | Grower (%) | Finisher (%) |
|---|---|---|---|
| Corn (%) | 56.71 | 61.47 | 67.89 |
| Soybean Meal 48 (%) | 34.45 | 30.1 | 24.34 |
| Fat (%) | 4.66 | 4.54 | 4.13 |
| Calcium Carbonate | 1.66 | 1.57 | 1.50 |
| Mono, Dical Phosphate | 1.59 | 1.44 | 1.37 |
| Salt | 0.38 | 0.38 | 0.38 |
| Vitamins | 0.25 | 0.25 | 0.25 |
| D,L-Methionine | 0.17 | 0.17 | 0.096 |
| Minerals | 0.05 | 0.05 | 0.05 |
| Coban ® 60 | 0.075 | 0.075 | — |
| Protein (%) | 22.0 | 20.0 | 18.0 |
| Energy (Kcal/kg) | 3124 | 3168 | 3212 |

Birds and feed were weighed weekly. Mortality was recorded daily and early losses (in the first four days of the study) were replaced. Dead birds were weighed to calculate a mortality-corrected feed conversion. Data was analyzed by analysis of variance (ANOVA). Treatment means were separated by means of a Duncan's multiple range test.

Trial 2: A trial was conducted at a poultry research facility to determine performance as measured by feed conversion rates, body weight gain and percent mortality. Nine hundred and sixty Ross x Cobb broilers were randomly placed in 24 pens, with 20 males and 20 females in each pen. The four treatments in this trial consisted of the control diet and the control diet with enzyme supplementation at 75 g/ton, 112.5 g/ton and 150 g/ton. This scheme provided for six repetitions per treatment. As in Trial 1, the enzyme concentrate was diluted with potable water to 1 l and sprayed on the feed as it mixed.

Broiler starter grower and finisher rations were used in this trial. The starter diet was fed to day 21, the grower from day 21 to 38, and the finisher from day 38 to the conclusion of the trial at 49 days. The diets in this study are those set out in Table 5. The starter ration was fed as a crumble, the grower and finisher as short pellets. Feed and water were provided ad libitum for the duration of the study. A coccidiostat (Coban®-60) was included at the rate of 0.075%. in the starter and grower diets. Birds and feed were weighed on a weekly basis. Mortalities Were recorded as they occurred and were used to correct feed conversion. Data was analyzed by ANOVA and treatments were separated using a Duncan's multiple range test.

The two broiler trials were conducted in order to evaluate the performance of the α-galactosidase enzyme system developed for corn/soybean meal diet. In the first trial, a control diet was compared against a diet supplemented with α-galactosidase. The second trial was a dose/response experiment where α-galactosidase was applied at increasing inclusion levels. For both experiments feed conversion, body weight and mortality were monitored weekly.

The results of Trial 1 α-galactosidase supplementation in feed conversion and body weight at six weeks of age are set out in Table 6 below.

TABLE 6

BODY WEIGHT AND FEED CONVERSION AT SIX WEEKS

|  | Control | α-galactosidase @ 45 g/ton |
|---|---|---|
| Body Weight (g) | 2191.7[b] | 2185.9[b] |
| Feed/Gain | 1.95[a] | 1.84[b] |

[a,b]Means within a row with different superscripts are statistically different ($p < 0.05$).

At six weeks, enzyme supplementation of the feed resulted in an 11-point improvement in feed conversion. No statistical difference in body weight was seen.

The cumulative weekly feed conversions for the six-week duration of the trial are illustrated in FIG. 1. Beginning in week five of the trial, feed conversions for the enzyme-supplemented test group showed a statistical improvement over the control group ($p \leq 0.05$). This trend continued in week six, resulting in an improvement of 11 points. The average percent mortality over the six-week duration of the trial was 9.5% for the control group, and 6.0% for the enzyme-supplemented group. These values were not statistically different.

In Trial 2, α-galactosidase supplementation was tested at various inclusion levels in order to determine the optimum application level. Final feed conversions and body weights for all treatment groups are set out in Table 7.

TABLE 7

BODY WEIGHT AND FEED CONVERSION AFTER SEVEN WEEKS

|  | Control | α-galactosidase @ 22.5 g/ton | α-galactosidase @ 33.8 g/ton | α-galactosidase @ 45 g/ton |
|---|---|---|---|---|
| Body Weight (g) | 2950.1 | 3008.7 | 2989.6 | 3009.1 |
| Feed/Gain | 1.922[a] | 1.905[ab] | 1.873[c] | 1.897[ab] |

[a,b,c]Means within a row with different superscripts are statistically different ($p < 0.05$).

After seven weeks, enzyme supplementation resulted in feed conversion improvements in the range of 1.7 to 4.9 points, with the 4.9-point improvement being statistically significant. As in Trial 1, no statistical improvement in body weight was observed. Cumulative weekly feed conversions and body weights are illustrated in FIG. 2. As in Trial 1, the full benefit in feed conversion with enzyme supplementation was observed in the latter stages of the trial. The average percent mortality over the seven-week duration of the trial was 11.5% for the control group and 11.25%, 9.17% and 10%, respectively, for the treatment groups. The mortality figures were not statistically different. The primary causes of mortalities in this trial were ascites and sudden death syndrome.

Table 8 sets out the release of reducing sugars and soluble proteins from enzyme-treated feed in this Example 2.

TABLE 8

The increased availability of nutrients induced by an α-galactosidase-based enzyme blend.

|  | Reducing Sugars (mM glucose) | Soluble Proteins (μg/ml) |
|---|---|---|
| Control | 5.4 | 2041 |
| a-galactosidase |  |  |
| Replicate 1 | 21.7 | 3609 |
| Replicate 2 | 21.8 | 3494 |
| Replicate 3 | 21.3 | 3450 |

Table 9 sets out the increased amino acid liberation induced by feed supplemented with α-galactosidase-based enzyme blend.

TABLE 9

The increased liberation of amino acids induced by an α-galactosidase-based enzyme blend.

Amino Acid Release (μg/ml)

|  | Example 1 | | Example 2 | | | |
|---|---|---|---|---|---|---|
| Amino Acid | Control | Treatment | Control | Treatment 1 | Treatment 2 | Treatment 3 |
| Phe | 75.00 | 145.20 | 81.61 | 173.07 | 178.48 | 154.89 |
| Val | 67.76 | 121.14 | 76.62 | 142.48 | 153.90 | 128.11 |
| Thr | 68.12 | 110.04 | 74.31 | 128.12 | 133.41 | 117.03 |
| Ile | 60.38 | 114.18 | 68.33 | 133.69 | 143.41 | 120.82 |
| Met | 23.97 | 30.19 | 21.83 | 30.65 | 32.07 | 28.93 |
| His | 46.35 | 82.29 | 49.25 | 92.94 | 94.65 | 85.15 |
| Arg | 181.05 | 318.31 | 182.91 | 371.84 | 374.39 | 337.41 |
| Lys | 129.67 | 231.48 | 152.04 | 277.28 | 290.13 | 252.26 |
| Leu | 97.48 | 187.98 | 108.38 | 226.84 | 235.79 | 204.22 |
| Cys | 23.14 | 30.38 | 25.73 | 36.30 | 37.22 | 34.83 |

In experimental trials and field trials conducted to date, α-galactosidase-based enzyme blend has been clearly shown to improve the feed/gain ratio by approximately six points. Other benefits, such as improved livability, body weight gains and improved relative breast meat yields were also observed, indicating enhanced availability and utilization of dietary nutrients and, possibly, a repartitioning effect favoring the development of lean tissue mass over fat deposition. The experimental results in Tables 8 and 9 furnish supporting evidence for these in vivo observations and provide clear evidence for the likely mode of action of an α-galactosidase-based enzyme blend. The direct release of additional sugars form indigestible polysaccharides provides additional energy to the birds. In addition, the removal of the anti-nutritional α-galactosides may positively impact the metabolic functions of the bacterial flora and improve residence time and nutrient utilization from all diet ingredients including fats and proteins. The results of the trials indicate substantial economical benefits for broiler producers when α-galactosidase supplementation is used in a high corn/soybean meal diet. Significant improvements in feed conversion of up to 11 points were observed in the first trial. In the second trial, an improvement of 4.9 points in feed conversion was obtained at the recommended application level of 33.8 g/ton, which can represent an economical benefit of 50 cents/lb reduction in feed costs.

EXAMPLE THREE

Trial 3: In an effort to substantiate previous findings, and to gain a better understanding of the effects of the enzyme mixture on broiler performance, a controlled trial was conducted. The trial was conducted during the summer season, and employed a commercial nutritional and management program.

Three thousand six hundred Peterson X Arbor Acres, straight run broiler chicks were randomly distributed among 72 equal sized pens at one day of age. A total of 50 chicks were placed in each pen to provide commercial like stocking densities. Chicks were maintained in the designated pens for the duration of the trial (49 days). Thirty-six pens were randomly assigned to each of the following two treatments; (a) Treatment 1—Control diets comprised of corn-soybean based commercial rations designated as starter, grower, finisher, and withdrawal; and (b) Treatment 2—Control diets supplemented with the enzyme blend.

All chicks were exposed to a commercial feeding and lighting program throughout the study. Feeds were manufactured at a commercial feed mill in the form of crumbles or pellets, and subsequently treated at a university feed milling facility. All feeds were handled similarly, with treated feeds sprayed with the enzyme mixture at the rate of 112 g of enzyme diluted with 888 g of water per ton. Composite feed samples were taken post enzyme application, as well as from the respective pens for subsequent analysis.

Body weights and feed conversions were determined at 28, 42, and 49 days of age. Pen mortality data, as well as cause(s) were determined on a daily basis. At 49 days of age, seven broilers per pen were randomly selected, weighed individually and sacrificed for subsequent dry carcass yield. The carcasses were then chilled for approximately 24 hours, and five of the seven birds were weighed individually and cut-up to obtain yield measurements.

No statistical differences in body weights were observed between broilers in treatments 1 and 2 at 28 (1.06 vs. 1.05 kg), 42 (1.86 vs. 1.86 kg), or 49 days of age (2.10 vs. 2.13 kg), respectively (Table 1). It is worthwhile noting the relatively low body weights attained by birds in both treatments, which was a direct consequence of the high environmental temperatures and relative humidity experienced throughout the study. Records of temperature readings inside, the test facilities were consistently in the 90 degrees plus range throughout the study (FIG. I). Exposure to such a heat stressful environment would no doubt affect the birds' ability to attain normal growth.

Feed conversions for enzyme supplemented and non-supplemented broilers were similar at 28 days of age (Table 1). However, at the market ages of 42 and 49 days, broilers supplemented with the enzyme mixture had significantly better feed conversions 1.87 vs. 1.93, and 2.10 vs. 2.29, respectively, than birds in the control treatment. These results are consistent with previous findings which reported significantly better feed efficiencies in broilers fed diets supplemented with the enzyme mixture. It has been postulated the nutrient liberating activities of the enzyme blend on corn-soybean based diets provided broilers with additional nutrients which would otherwise be unavailable to the bird. The possible net effect of these endogenous and exogenous enzymatic activities could be an increase in available nutrients, a concurrent decrease in the metabolic requirements during digestion, which would result in an improvement in feed utilization. The significant improvements in feed efficiency and livability (Table 10) observed in this study provide support to this postulate.

TABLE 10

Enzyme supplementation and its effects on broiler performance

| Parameter | Control | Enzyme blend |
| --- | --- | --- |
| Body Wt., 28 d (kg) | 1.06$^a$ | 1.05$^a$ |
| Feed Conv., 28 d | 1.54$^a$ | 1.54$^a$ |
| Mortality, 28 d (%) | 1.11$^a$ | 0.72$^a$ |
| Body Wt., 42 d (kg) | 1.86$^a$ | 1.86$^a$ |
| Feed Conv., 42 d | 1.93$^a$ | 1.87$^b$ |
| Mortality, 42 d (%) | 8.05$^a$ | 4.23$^b$ |
| Body Wt., 49 d (kg) | 2.10$^a$ | 2.13$^a$ |
| Feed Conv., 49 d | 2.29$^a$ | 2.10$^b$ |
| Mortality, 49 d (%) | 13.12$^a$ | 7.01$^b$ |

$^{a,b}$Means within a row with no common superscript differ significantly (P < 0.05).

Mortality during the 28-day growth period was similar (1.11% vs. 0.72%) for both treatment groups (Table 1). However, by 42 and 49 days of age, a significant increase in mortality was observed in both groups as a result of severe heat stress (high ambient temperature and relative humidity) challenges. Maximum temperatures inside the house are illustrated in FIG. I. Broilers supplemented with the enzyme mixture had significantly lower mortalities at 42 (4.2% vs. 8.0%) and 49 days of age (7.0% vs. 13.1%), respectively, when compared to control birds. The magnitude of the difference in mortality measured between the two groups would no doubt impact the respective feed efficiencies attained by the enzyme supplemented and non-supplemented broilers.

EXAMPLE FOUR

Trial 4: The performance of broilers fed an enzyme-supplemented diet was compared to those fed a basal diet over a 52 day growout period. Animals were housed in two categories of living environments which typify housing conditions found in contemporary poultry farming operations. A first typical housing environment is referred to generally as conventional housing. A second typical housing environment is referred to as tunnel housing. Tunnel houses feature improved ventilation, airflow, and temperature when compared to conventional housing.

Performance was monitored by the measurement and evaluation of feed conversion, body weight, weight gain, and meat yield. Meat yield was based on the following: live weight, carcass weight without giblets (WOG), breast weight, tenders weight, wing weight, and back weight. A total of four hundred and forty broiler chicks with equivalent gender distribution were randomly assigned to three farms, with two houses per farm, to serve as control animals, forty-eight of which were kept in conventional housing, and three hundred and ninety-two of which were kept in tunnel housing. A total of four hundred and twenty-nine broiler chicks with equivalent gender distribution were randomly assigned to three farms, with two houses per farm, to serve as the treatment animals, ninety-four of which were kept in conventional housing, and three hundred and thirty-five of which were kept in tunnel housing. The experimental enzyme product was used at an application rate of 112 g/ton of finished feed. The enzyme concentrate was diluted with potable water and then sprayed onto the feed post-pelleting.

A five-feed program was used in which the starter diet was fed for 13 days, the finisher diet from day 14 to 30, the withdrawal 1 diet from day 31 to 38, the withdrawal 2 diet from day 39 to 49, and the withdrawal 3 diet from day 49 to the conclusion of the trial at 52 days. Feed and water were available ad libitum over the duration of the study. Nutrient specifications and composition of the diets are outlined in Table 5 as found above.

Table 11 summarizes below the performance of animals housed in two categories of living environments, namely, conventional and tunnel housing, fed either a control diet or a diet treated with α-galactosidase. Statistical significance is noted by non-common superscripts for values where p≦0.05 or where p≦0.10.

TABLE 11

Performance Summary (Using Combined Controls)

|  | N | Body Weight (lbs) | Feed Conv. | Adj. Feed Conv. | Livability (%) |
|---|---|---|---|---|---|
| Conventional houses |  |  |  |  |  |
| Control | 19 | 5.02 | 2.104[b] | 2.101[b] | 95.26 |
| Treated | 15 | 4.90 | 1.976[a] | 1.992[a] | 95.80 |
| All tunnel houses |  |  |  |  |  |
| Control | 37 | 5.48[a] | 2.050[a] | 1.970 | 96.19 |
| Treated | 29 | 5.69[b] | 2.085[b] | 1.970 | 95.43 |

TABLE 11-continued

Performance Summary (Using Combined Controls)

|  | N | Body Weight (lbs) | Feed Conv. | Adj. Feed Conv. | Livability (%) |
|---|---|---|---|---|---|
| All houses |  |  |  |  |  |
| Control | 56 | 5.32 | 2.068 | 2.015[b*] | 95.56 |
| Treated | 44 | 5.42 | 2.048 | 1.978[a*] | 95.90 |

[ab]figures with non-common superscripts are significantly different (p ≦ 0.05)
[ab*]figures with non-common superscripts are significantly different (p ≦ 0.10)

Table 12 summarizes the performance of animals housed in two categories of living environments, namely, conventional and tunnel housing, fed either a control diet or a diet treated with an α-galactosidase-based enzyme blend. Statistical significance is noted by non-common superscript for values where p≦0.05 or where p≦0.10. Generally, the results indicate significant improvements in animals housed in tunnel housing. This observation becomes more pronounced in animals fed a diet treated with an α-galactosidase-based enzyme blend. This observable tread holds true even when the results from animals housed in tunnel housing are combined with the results of animals housed in conventional housing. Overall improvements were observed in animals fed an α-galactosidase-based enzyme blend supplemented diet in terms of live weight, WOG weight, breast weight, tenders weight, wings weight, and back weight. The results as tabulated in Tables 11 and 12 indicate substantial economic benefits for broiler producers when α-galactosidase-based enzyme blend supplementation is used in a high corn/soybean meal diet.

TABLE 12A

Yield Study Summary by House Type (Using Combined Controls)

| House Type | N | Treatment | Live Weight (kg) | WOG Weight | WOG Live Weight (%) | Breast Weight | Breast/ WOG (%) | Tndrs. Weight (kg) | Tndrs WOG (%) |
|---|---|---|---|---|---|---|---|---|---|
| Conventional | 48 | Control | 1.93[a] | 1.31[a] | 67.73[a] | 0.24[a] | 18.14[a] | 0.063a | 4.82 |
|  | 94 | Treated | 2.23[b] | 1.54[b] | 69.36[b] | 0.30[b] | 19.56[b] | 0.075[b] | 4.84 |
| Tunnels | 392 | Control | 2.55[a] | 1.77[a] | 69.34[a] | 0.35[a] | 19.78[a] | 0.086[a] | 4.87 |
|  | 335 | Treated | 2.62[b] | 1.83[b] | 69.81[b] | 0.37[b] | 20.22[b] | 0.092[b] | 5.07 |
| All houses | 440 | Control | 2.43[p] | 1.68[a] | 69.14[a] | 0.33[a] | 19.54[a] | 0.081[a] | 4.84 |
|  | 429 | Treated | 2.53[b] | 1.77[b] | 69.71[b] | 0.35[b] | 20.07[b] | 0.088[b] | 5.02 |

TABLE 12B

Yield Study Summary by House Type (Using Combined Controls)

| House Type | N | Treatment | Total Breast (kg) | Total Breast/ WOG (%) | Wings Weight (kg) | Wings/ WOG (%) | Back Half (kg) | Back/ WOG (%) |
|---|---|---|---|---|---|---|---|---|
| Conventional | 48 | Control | 0.300 | 22.96[a] | 0.153[a] | 11.75 | 0.60[a] | 46.09[b*] |
|  | 94 | Treated | 0.370 | 24.39[b] | 0.181[b] | 11.78 | 0.70[b] | 45.36[a*] |
| Tunnels | 392 | Control | 0.436 | 24.65[a] | 0.207[a] | 11.78 | 0.80[a] | 45.24 |
|  | 335 | Treated | 0.462 | 25.28[b] | 0.214[b] | 11.77 | 0.83[b] | 45.29 |
| All houses | 440 | Control | 0.411 | 24.38[a] | 0.199[a] | 11.87[b*] | 0.76[a] | 45.33 |
|  | 429 | Treated | 0.438 | 25.09[b] | 0.207[b] | 11.77[a*] | 0.80[b] | 45.31 |

[ab]figures with non-common superscripts are significantly different for p ≦ 0.05.
[ab*]figures with non-common superscripts are significantly different for p ≦ 0.10.
WOG: without giblets Although the invention has been described with respect to a preferred embodiment thereof, it is to be also understood that it is not to be so limited since changes and modifications can be made therein which are within the full intended scope of this invention as defined by the appended claims.

We claim:

1. A method to increase carcass yield and decrease the deposition of fat in chicken, by feeding said chicken a chicken feed composition comprising:

(a) protein, vitamins and minerals;
    (b) a source of carbohydrates comprising a galactoside selected from the group consisting of soybeans and corn; and
    (c) an α-galactosidase-based enzyme blend that catalyzes the degradation of the galactoside, where the addition of the α-galactosidase-based enzyme blend increases the carcass mass, and decreases the amount of fat deposited during growth of a chicken fed the feed composition, relative to the chicken fed on an identical feed composition absent the α-galactosidase-based enzyme blend.

2. A method according to claim 1, wherein the galictosidase is added to the feed composition to increase the amount of galactosidase by between about 22.5 grams per ton and about 75 grams per ton.

3. A method according to claim 1, wherein the galictosidase is added to the feed composition to increase the amount of galactosidase by between about 30 grams per ton and about 45 grams per ton.

4. A method according to claim 1, wherein said increase in carcass mass is between about 1% and about 20%.

5. A method according to claim 1, wherein said decrease in fat deposition is between about 1% and about 20%.

6. A method according to claim 1, wherein said carcass comprises breast meat, thigh meat, wing meat, and back meat.

7. A nutritive method for a poultry animal to increase carcass yield and decrease the deposition of fat in the poultry, comprising the steps of:

(a) preparing a feed composition comprised of protein, vitamins, and minerals, and further comprising a carbohydrate source comprised of a galactoside selected from the group consisting of soybeans and corn; and
    (b) supplementing the feed composition with a galactosidase that catalyzes the degradation of the galactoside, where the addition of said galactosidase increases the amount of carcass mass and decreases the amount of fat deposited during growth of a poultry animal fed the feed composition relative to the poultry animal fed on an identical feed composition absent the galactosidase.

8. A nutritive method according to claim 6, wherein the galactosidase is added to the feed composition to increase the amount of galactosidase by between about 22.5 grams per ton and about 75 grams per ton.

9. A nutritive method according to claim 6, wherein the galactosidase is added to the feed composition to increase the amount of galactosidase by between about 30 grams per ton and about 45 grams per ton.

10. A nutritive method according to claim 6, wherein said increase in carcass mass is between about 1% and about 20%.

11. A nutritive method according to claim 6, wherein said decrease in fat deposition is between about 1% and about 20%.

12. A nutritive method according to claim 6, wherein said galactosidase is an α-galactosidase-based enzyme blend.

13. A method to increase the yield of white meat and decrease the deposition of fat in poultry, by feeding said poultry a feed composition comprising:

(a) protein, vitamins and minerals;
    (b) a source of carbohydrates comprising a non-starch polysaccharide selected from the group consisting of soybeans and corn; and
    (c) an enzyme that catalyzes the degradation of the non-starch polysaceharide, where the addition of the enzyme increases the amount of carcass mass and decreases the amount of fat deposited during growth of a poultry animal fed the feed composition relative to the animal fed on an identical feed composition absent the enzyme.

14. A nutritive method according to claim 6, wherein said carcass comprises breast meat, thigh meat, wing meat, and back meat.

15. A method to increase carcess yield and decrease the deposition of fat in chicken, by feeding said chicken a feed supplement for addition to a chicken feed composition including a source of carbohydrates comprising a galactoside selected from the group consisting of soybeans and corn, comprising:

(a) an α-galactosidase that catalyzes the degradation of the galactoside, where the addition of the α-galactosidase increases the carcass mass, and decreases the amount of fat deposited during growth of a chicken fed the feed composition, relative to the chicken fed on an identical feed composition absent the α-galactosidase.

16. A method according to claim 15, wherein the α-galactosidase is an α-galactosidase-based enzyme blend.

* * * * *